(No Model.)
F. B. CHAPIN & J. W. MERCER.
CREAMER.
No. 266,769.  Patented Oct. 31, 1882.
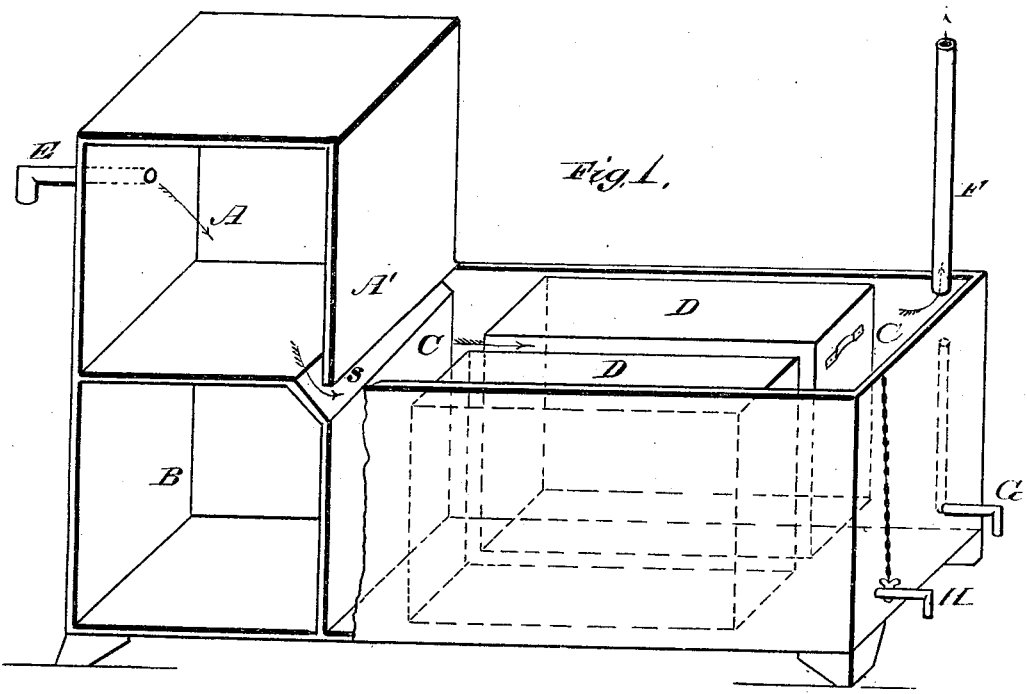
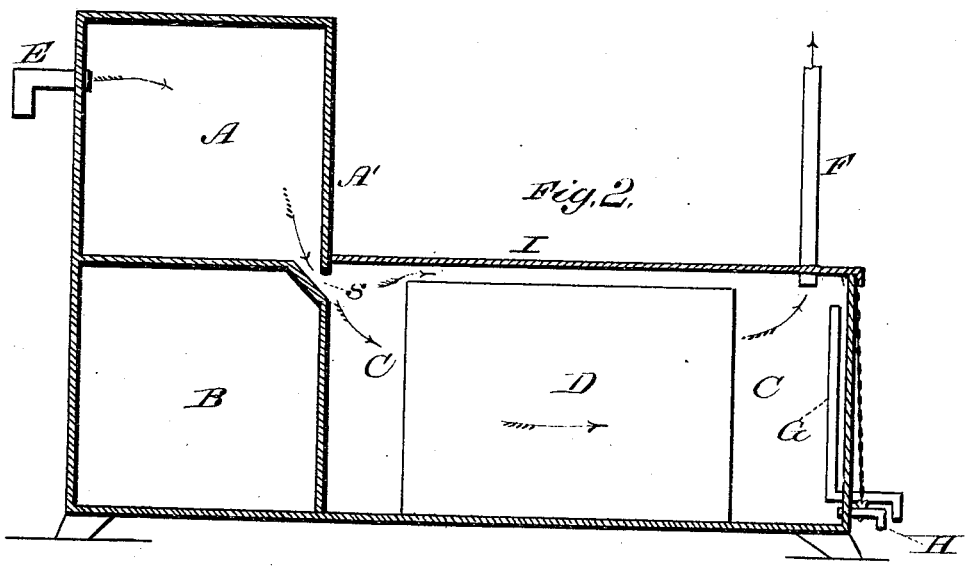
WITNESSES
E. H. Bates
W. J. Johnston
INVENTORS
Frank B. Chapin
John W. Mercer
By Edw. J. Underwood
ATTORNEY

UNITED STATES PATENT OFFICE.

FRANK B. CHAPIN, OF DETROIT, AND JOHN W. MERCER, OF CANDOR, MINNESOTA.

CREAMER.

SPECIFICATION forming part of Letters Patent No. 266,769, dated October 31, 1882.

Application filed April 11, 1882. (No model.)

*To all whom it may concern:*

Be it known that we, FRANK B. CHAPIN and JOHN W. MERCER, citizens of the United States, residing respectively at Detroit, Becker county, and Candor, in the county of Otter Tail and State of Minnesota, have invented certain new and useful Improvements in Creamers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to an improved milk cooler or creamer designed to raise cream on the milk in the cream-gathering pans and keep the contents of the pans cool during the time they are in the cooler; and it consists in an arrangement of the several parts of the machine, as will be hereinafter more fully set forth in the specification and claims, and pointed out in the accompanying drawings.

In the drawings, in which the same parts are designated by like letters in the several figures, Figure 1 is a perspective view of the cooling apparatus with the side of the tank broken away to show the pans; and Fig. 2 is a sectional view of the same.

A is the ice-chest, mounted on the refrigerator B, and communicating through an opening, S, near the bottom of its adjacent side A', with the tank C, the chest B, near the top, being beveled off and the lower edge of the side A' projecting below the top I, so as to form a channel for the flow of water and air-currents into the tank. This ice-chest is designed to be filled with ice, and through a pipe, E, air is introduced, and, passing over and around the ice, is cooled and then enters the tank C, which contains the milk-receptacles D D, and, passing over and around the pans or receptacles for the milk, cools the contents and escapes through the outlet-pipe F, carrying with it the animal odors and impurities, and leaving the milk and cream perfectly pure. At the same time the water from the melting ice in A runs through the opening S into the tank and surrounds the milk-pans, but is prevented from overflowing them by the escape-pipe G, whose opening is two or three inches lower than the top of the pans D. The tank C is designed to receive two, four, six, or more pans, placed end to end in pairs, though but two are represented in the drawings.

The ice-chest, refrigerator, and tank are constructed usually of wood and lined with galvanized iron. It is designed to fix the cooler in a firm and immovable position and lead the pipes E and F to the open air. The ice-chest and refrigerator have air-tight doors, and the tank is covered with a strong wooden top hinged to the rear and fitting closely to the top edges, so that no air can escape or enter when it is closed save by the pipes E and F. The opening S of the ice-chest is below the top of the tank C, and is inclosed when the cover is down. H is a pipe at the bottom of the tank, provided with a chain-valve or thumb-screw, by which the water in the tank may be drawn off. The pipe F leads into the open air, and is ten or twenty feet higher than the supply-pipe E, so as to furnish a strong and constant draft of air, passing in the direction of the arrows through the ice-chest, over and around the milk-pans in the tank, and out into the open air.

We construct our milk-pans of heavy tin, of the dimensions of about eighteen inches long, nineteen inches deep, and six inches wide, and there is sufficient space all around and between them for the passage of the cold air or water. These pans are provided with removable covers of perforated tin, which permits the entry of the cold air at all times. The pipes E and F are usually two inches in diameter, and are intended to be always open, thus insuring a continuous current of air passing over and around the pans. In cold weather it will not be necessary to use ice in the ice chest or tank, as the external air at 40° will keep the milk cold enough. The floor of the ice-chest slopes a little toward the opening S, so that the water from the melting ice will run into the tank.

Hitherto it has been usual to surround the milk-receptacles in the tank with ice, and often in hot weather the ice melted and the milk in the pans soured before the cream had entirely risen; but by our device the current of cold air, continuously circulating about and over the receptacles, prevents any change of temperature, and will keep the surrounding water cold in the very hottest weather.

We are aware that it is an old device to surround milk pans or receptacles in a tank with ice or ice-water, as is a covered tank or box to contain the milk-receptacles, and therefore we do not claim such devices, broadly; but What we do claim as our invention, and desire to secure by Letters Patent, is—

In a milk-cooler, the combination of an ice-chest provided with an air-inlet pipe, E, a milk-pan receptacle, C, provided with an air-outlet pipe by means of which the air and animal odors are carried off, an overflow-pipe, G, and water-escape pipe H, the bottom of the ice-chest sloping to an opening to the pan-receptacle formed by the beveled edge of the refrigerator and projecting to one side, A', of the ice-chest, substantially as shown and described, and for the purpose set forth.

In testimony whereof we affix our signatures in presence of two witnesses.

FRANK B. CHAPIN.
JOHN W. MERCER.

Witnesses:
MELVIN E. DAHL,
ALVIN H. WILCOX.